(12) United States Patent  
Naoi

(10) Patent No.: US 8,363,059 B2
(45) Date of Patent: Jan. 29, 2013

(54) RENDERING PROCESSING APPARATUS, PARALLEL PROCESSING APPARATUS, AND EXCLUSIVE CONTROL METHOD

(75) Inventor: Junichi Naoi, Tokyo (JP)

(73) Assignee: Sony Computer Entertainment Inc. (JP)

( * ) Notice: Subject to any disclaimer, the term of this patent is extended or adjusted under 35 U.S.C. 154(b) by 927 days.

(21) Appl. No.: 11/793,640

(22) PCT Filed: Jul. 25, 2006

(86) PCT No.: PCT/JP2006/314616
§ 371 (c)(1),
(2), (4) Date: Jul. 30, 2008

(87) PCT Pub. No.: WO2007/052394
PCT Pub. Date: May 10, 2007

(65) Prior Publication Data
US 2008/0313434 A1    Dec. 18, 2008

(30) Foreign Application Priority Data

Oct. 31, 2005   (JP) .................................. 2005-315753

(51) Int. Cl.
| | |
|---|---|
| G06F 15/00 | (2006.01) |
| G06F 15/16 | (2006.01) |
| G06F 15/80 | (2006.01) |
| G06F 9/30 | (2006.01) |
| G06F 9/40 | (2006.01) |
| G06T 1/00 | (2006.01) |

(52) U.S. Cl. ......... 345/501; 345/503; 345/505; 712/216
(58) Field of Classification Search .................... 345/501
See application file for complete search history.

(56) References Cited

U.S. PATENT DOCUMENTS

| | | | |
|---|---|---|---|
| 4,967,392 A * | 10/1990 | Werner et al. ................. | 345/505 |
| 5,010,515 A | 4/1991 | Torborg, Jr. | |
| 5,586,246 A | 12/1996 | Nobori et al. | |
| 5,768,489 A | 6/1998 | Adachi et al. | |
| 5,978,563 A | 11/1999 | Kawamoto et al. | |

(Continued)

FOREIGN PATENT DOCUMENTS

JP    7234947    9/1995

OTHER PUBLICATIONS

Crockett T W: "An introduction to parallel rendering" Parallel Computing, Elsevier Publishers, Amsterdam, NL, vol. 23, No. 7, Jul. 1, 1997, pp. 819-843, XP004729969.

(Continued)

*Primary Examiner* — James A Thompson
*Assistant Examiner* — Wynton S Jones
(74) *Attorney, Agent, or Firm* — Lerner, David, Littenberg, Krumholz & Mentlik, LLP

(57) ABSTRACT

A DDA 34 notifies the coordinates of a rasterized pixel to an exclusive control part 40, acquires a unique identification number associated with the pixel position from the exclusive control part 40, and adds the identification number to pixel data and supplies it to a shader 20. A plurality of shader pipes 22 in the shader 20 perform arithmetic processing for rendering pixels in parallel, and writes the processing results to a frame buffer 50. When performing an arithmetic instruction that requires exclusive control over a pixel, each shader pipe 22 issues a request to lock the pixel by notifying the identification information added to that pixel to the exclusive control part 40. If the lock request is accepted, the shader pipe 22 performs the arithmetic processing on that pixel. If the lock request is rejected, the shader pipe suspends and puts the arithmetic processing on that pixel into a wait state, and executes arithmetic processing on another pixel in the interim.

10 Claims, 7 Drawing Sheets

U.S. PATENT DOCUMENTS 7,064,756 B2 * 6/2006 Nakatsuka et al. ........... 345/426
2004/0104915 A1 * 6/2004 Mori et al. .................... 345/561

OTHER PUBLICATIONS

Dal Poz M A et al: "A high performance processor for real-time ray-tracing image rendering" Circuits and Systems, 2005, 48th Midwest Symposium on Cinicinnati, Ohio Aug. 7-10, 2005, Piscataway, US, Aug. 7, 2005, pp. 867-870, XPO 1089 3727.

Supplementary European Search Report, EP 06781528, dated Dec. 23, 2009.

International Search Report, PCT/JP2006/314616.

* cited by examiner

RENDERING PROCESSING APPARATUS, PARALLEL PROCESSING APPARATUS, AND EXCLUSIVE CONTROL METHOD

TECHNICAL FIELD

This invention relates to a parallel processing apparatus that performs arithmetic processing on data in parallel, a rendering processing apparatus that performs arithmetic processing on rendered data, and an exclusive control method therefor.

BACKGROUND ART

A rendering engine for three-dimensional computer graphics is becoming programmable and more processor-like in order to deal with complicated and sophisticated shading algorithms. In particular, a pixel shader or a core of the rendering engine is no longer a hardware unit with a predefined graphics functions implemented therein, but the shader is now a processor that has a built-in arithmetic unit provided with an instruction set. The shader is now capable of flexibly realizing additional functions by programming as CPU is.

Pixel operation processing by the pixel shader is extremely high in parallelism in comparison to arithmetic processing by a general-purpose processor. Furthermore, since the pixel shader has some control mechanisms using a multithread method and/or an interleaving method for hiding latency in pipeline processing, the shader can achieve even a higher degree of pseudo parallelism. The greater the degree of the parallelism in a pixel shader, the greater the possibility to perform arithmetic processing on an identical pixel at the same time will be. Thereby, the other arithmetic processes might occur while performing a read-modify-write (RMW) operation on the pixel, possibly failing to provide an expected operation result. To ensure consistency between multiple arithmetic processes on the identical pixel, it is absolutely necessary for the pixel shader to exercise exclusive control over the arithmetic processes.

In order to achieve exclusive control over the pixel operation processes, RMW function is, conventionally, removed from the pixel shader so that a RMW unit separated from the pixel shader can exercise exclusive control over the read and write from/to the frame buffer. Now since the pixel shader does not access the frame buffer, it requires no exclusive control, and therefore the exclusive control has only to be practiced in the RMW unit solely. This facilitates the implementation of the exclusive control.

DISCLOSURE OF THE INVENTION

Problems to be Solved by the Invention

In the conventional method in which the RMW function is removed from the pixel shader, however, the pixel shader cannot perform any RMW operations for the frame buffer. This limits the variety of possible pixel operations to be undertaken. For instance, a repeat operation is impossible to perform, such as outputting intermediate results to the frame buffer and reading the intermediate results for further arithmetic processing. In order to enable the pixel shader to execute a complicated shading algorithm and/or perform a sophisticated arithmetic processing such as image processing, there arises an increasing need to incorporate the RMW function into the pixel shader and to achieve an enhanced functionality of the entire rendering processing. In this situation, it is evident that there is a limitation in the method in which the RMW function is removed from the pixel shader to realize the exclusive control.

The present invention has been developed in view of the foregoing problems, and a general purpose thereof is to provide an exclusive control technology which is capable of executing efficient exclusive control over parallel processing, and a parallel processing technology and a rendering processing technology which make use of the exclusive control technology.

Means to Solve the Problems

To solve the foregoing problems, a rendering processing apparatus according to one embodiment of the present invention includes: a rasterizer which rasterizes a rendering primitive in succession to generate a plurality of pixels; a shader having a plurality of arithmetic processing parts which perform arithmetic processing on the plurality of pixels in parallel; and an exclusive control part which exercises exclusive control over arithmetic processing on an identical pixel performed by the plurality of arithmetic processing parts. The exclusive control part is operable to: update a value of an execution order counter indicating order of execution of arithmetic processing each time the rasterizer generates a pixel; assign the updated value of the execution order counter to the generated pixel; and accept, upon receiving from the plurality of arithmetic processing parts requests to lock a target pixel subject to arithmetic processing, the lock requests in order of the value of the execution order counter assigned to the target pixel, whereby the order of execution of the arithmetic processing on the identical pixel performed by the plurality of arithmetic processing parts is controlled.

Another embodiment of the present invention is a parallel processing apparatus. This apparatus includes: a plurality of arithmetic processing parts which perform arithmetic processing on a plurality of processing units in parallel; an assignment part which assigns to each processing unit in advance a value of an execution order counter indicating order of execution of arithmetic processing expected to be performed by the plurality of arithmetic processing parts; and an exclusive control part which is operable to: receive requests to lock a target processing unit subject to arithmetic processing from any of the arithmetic processing parts for actually performing the arithmetic processing; and accept the lock requests in order of the value of the execution order counter assigned to the target processing unit, whereby the order of execution of the arithmetic processing on the identical processing unit performed by the plurality of arithmetic processing parts is controlled.

Yet another embodiment of the present invention is an exclusive control method. This method is for providing exclusive control in an apparatus which performs arithmetic processing on a plurality of processing units in parallel. The method including: assigning to each processing unit in advance a value of an execution order counter indicating order of execution of arithmetic processing expected to be performed on the respective processing units; receiving requests to lock a target processing unit subject to arithmetic processing when the arithmetic processing on the processing units is actually performed; and accepting the lock requests in order of the value of the execution order counter assigned to the target processing unit, whereby the order of execution of the arithmetic processing on the identical processing unit is controlled.

It should be appreciated that any combinations of the foregoing components, and any conversions of expressions of the present invention from/into methods, apparatuses, systems, computer programs, data structures, and the like are also intended to constitute applicable embodiments of the present invention.

Advantages of the Invention

According to the present invention, it is possible to execute efficient exclusive control in parallel processing.

Figure 1:
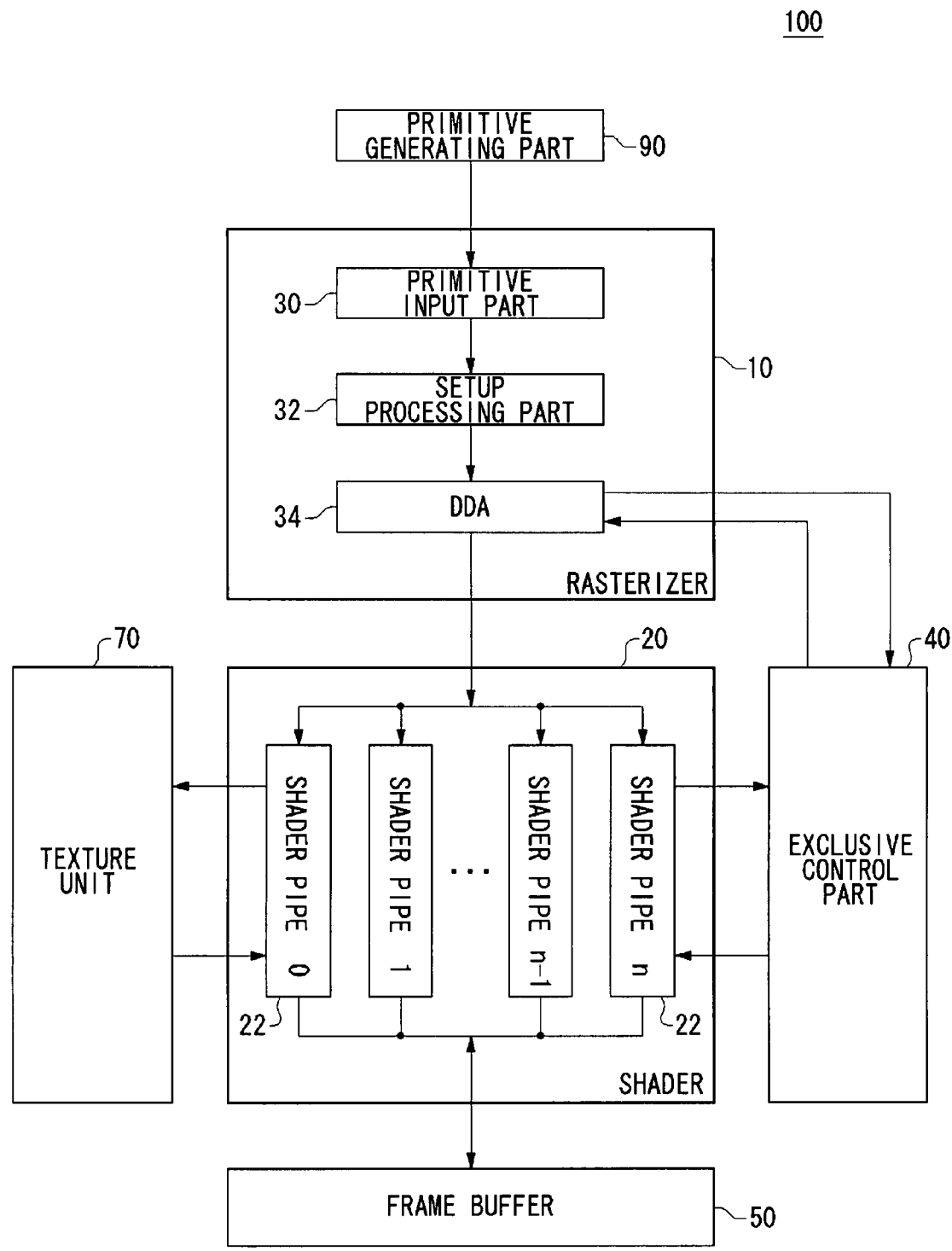
FIG. 1 is a block diagram of a rendering processing apparatus according to an embodiment.

DESCRIPTION OF REFERENCE NUMERALS 10 rasterizer, 20 shader, 22 shader pipe, 24 shader core, 26 synchronization control part, 28 instruction cache, 30 primitive input part, 32 setup processing part, 34 DDA, 40 exclusive control part, 42 lock queue, 44 arbitration part, 46 lock cache, 48 dispatcher, 50 frame buffer, 60 memory, 70 texture unit, 90 primitive generating part, 100 rendering processing apparatus, 110 unlock FIFO, 112 lock FIFO.

BEST MODE FOR CARRYING OUT THE INVENTION

FIG. 1 is a block diagram of a rendering processing apparatus 100 according to an embodiment. The rendering processing apparatus 100 performs rendering processing for generating rendered data to be displayed on a two-dimensional screen based on three-dimensional model information.

A primitive generating part 90 generates primitives to be drawn, and supplies them to a rasterizer 10. A rendering primitive is a unit of rendering a geometric figure such as a point, a line, a triangle, or a rectangle, when a three-dimensional object is represented in a polygonal model. The data of the rendering primitive is represented in a unit of a vertex. The primitive generating part 90 constitutes part of the rendering processing apparatus 100 in the diagram. Alternatively, the primitive generating part 90 may be a dedicated processor or a vertex shader for generating polygon model information, or may be arranged outside the rendering processing apparatus 100 and network-connected with the rendering processing apparatus 100.

The rasterizer 10 acquires vertex data of a rendering primitive from the primitive generating part 90, and transforms the rendering primitive into rendering units corresponding to the screen.

Here, the "rendering unit" typically refers to a pixel area of a predetermined size, which may be a single pixel or a set of pixels. A rendering unit may also refer to one of sub pixels into which a single pixel is subdivided, or a set of such sub pixels. Hereinafter, a rendering processing technology characteristic to the present embodiment will be described. For ease of description, an entire rendering unit, even when it consists of a plurality of pixels or a plurality of sub pixels, shall be regarded as a single pixel, hiding the processing of the individual pixels or sub pixels within the rendering unit. Thus, the "rendering unit" will hereinafter be referred to simply as a pixel.

For example, a rendering primitive has a triangular shape. The rasterizer 10 performs view transformation for converting a triangle lying in a three-dimensional space into a triangle on the drawing plane through projection transform. Then, the rasterizer 10 scans the triangle on the drawing plane in the horizontal direction of the drawing plane while converting the triangle into quantized pixels row by row. The rendering primitive is thus expanded into pixels by the rasterizer 10. The pixel data calculated for each pixel includes color values represented in RGB, an alpha value indicating a transparency, a Z value indicating a depth, and UV coordinate values or parametric coordinates for referring to texture attributes.

The detailed configuration of the rasterizer 10 is now described. A primitive input part 30 generates a stream which includes vertex coordinates and parameters of rendering primitives received from the primitive generating part 90, and supplies them to a setup processing part 32.

The setup processing part 32 sets up various types of parameters for processing the stream of rendering primitives with a digital differential analyzer (DDA). Specifically, the setup processing part 32 sets rendering bounding boxes and various types of DDA processing parameters such as an edge coefficient. The setup processing part 32 supplies the setup rendering primitive data to a DDA 34.

The DDA 34 performs DDA processing on the rendering primitives supplied directly from the setup processing part 32, based on the various types of parameters set by the setup processing part 32, thereby converting them into pixel data.

The DDA 34 notifies the screen coordinates (x, y) of a generated pixel to an exclusive control part 40, and acquires from the exclusive control part 40 an identification number that is unique to that pixel position during pipeline processing after the DDA processing. This identification number will be referred to as "sync ID." The DDA 34 adds this sync ID to the pixel data on the rendering primitive, and supplies the resultant to a shader 20.

The shader 20 has a plurality of shader pipes 22 (hereinafter, referred to as shader pipes 0 to n) which asynchronously operate. The shader pipes 22 process pixel data they are respectively in charge of to perform pixel rendering processing in parallel through pipeline processing, and read/write the results of processing on the pixel data from/to a frame buffer 50.

While each shader pipe 22 performs arithmetic processing on pixel data and writes it to the frame buffer 50, exclusive control must be executed so that the other shader pipes 22 do not read or write the pixel data retained in the frame buffer 50. For the purpose of this exclusive control, each shader pipe 22 makes a request to lock the pixel by notifying the exclusive control part 40 of the sync ID added to that pixel when performing an arithmetic instruction that requires exclusive control over the pixel. Moreover, when the execution of the arithmetic instruction that requires exclusive control over the pixel is completed, each shader pipe 22 issues an unlock request to the exclusive control part 40.

The exclusive control part 40 receives a pixel lock request from each shader pipes 22 of the shader 20, determines whether or not to accept the lock request, and if accepted, notifies information that indicates acceptance to each shader pipe 22. If the lock request is accepted, the shader pipe 22 performs arithmetic processing on that pixel. If the lock request is not accepted, no notification is made from the exclusive control part 40. The shader pipe 22 then suspends the arithmetic processing on that pixel and puts it in a wait state until the lock request is accepted, and then executes arithmetic processing on another pixel in the interim.

If a lock-requested pixel is not locked by any of the shader pipes 22, the exclusive control part 40 accepts the lock request and exercises control so that the lock-requesting shader pipe 22 can perform arithmetic processing on that pixel, and read/write it from/to the frame buffer 50 exclusively. If the lock-requested pixel has been locked by another shader pipe 22, the lock request is not accepted until the locking shader pipe 22 unlocks that pixel. In order to efficiently handle lock information on all the pixels generated by the DDA 34, the exclusive control part 40 retains the lock information in a cache memory.

Under the above-mentioned exclusive control, the shader 20 performs shading processing t6 determine the color values of the pixels based on the pixel data calculated by the rasterizer 10. When performing further texture mapping, the shader 20 synthesizes the color values of textures acquired from a texture unit 70 to calculate the final color values of the pixels, and writes the pixel data to the frame buffer 50.

The texture unit 70 performs the processing of mapping texture data to the pixels to be processed by the shader 20. The position of texture mapped to the pixel on a polygonal surface is represented in two-dimensional parametric coordinates, or a UV coordinate system. The texture unit 70 acquires a UV coordinate value of texture to be mapped to the pixel from the shader 20, and converts the UV coordinate value into a reference address. The texture unit 70 then acquires a color value corresponding to the reference address from the texture, and supplies it to the shader 20.

The shader 20 also performs fogging, alpha-blending, and other processing on the rendered data retained in the frame buffer 50, thereby determining the final color value of the pixel and updating the pixel data in the frame buffer 50.

The frame buffer 50 is a buffer in which the pixel data generated by the shader 20 is stored with screen coordinates. The stored pixel data may be of a final image to be rendered or an intermediate image in the process of shading processing. The pixel data stored in the frame buffer 50 is output to and displayed on a display device.

Figure 2:
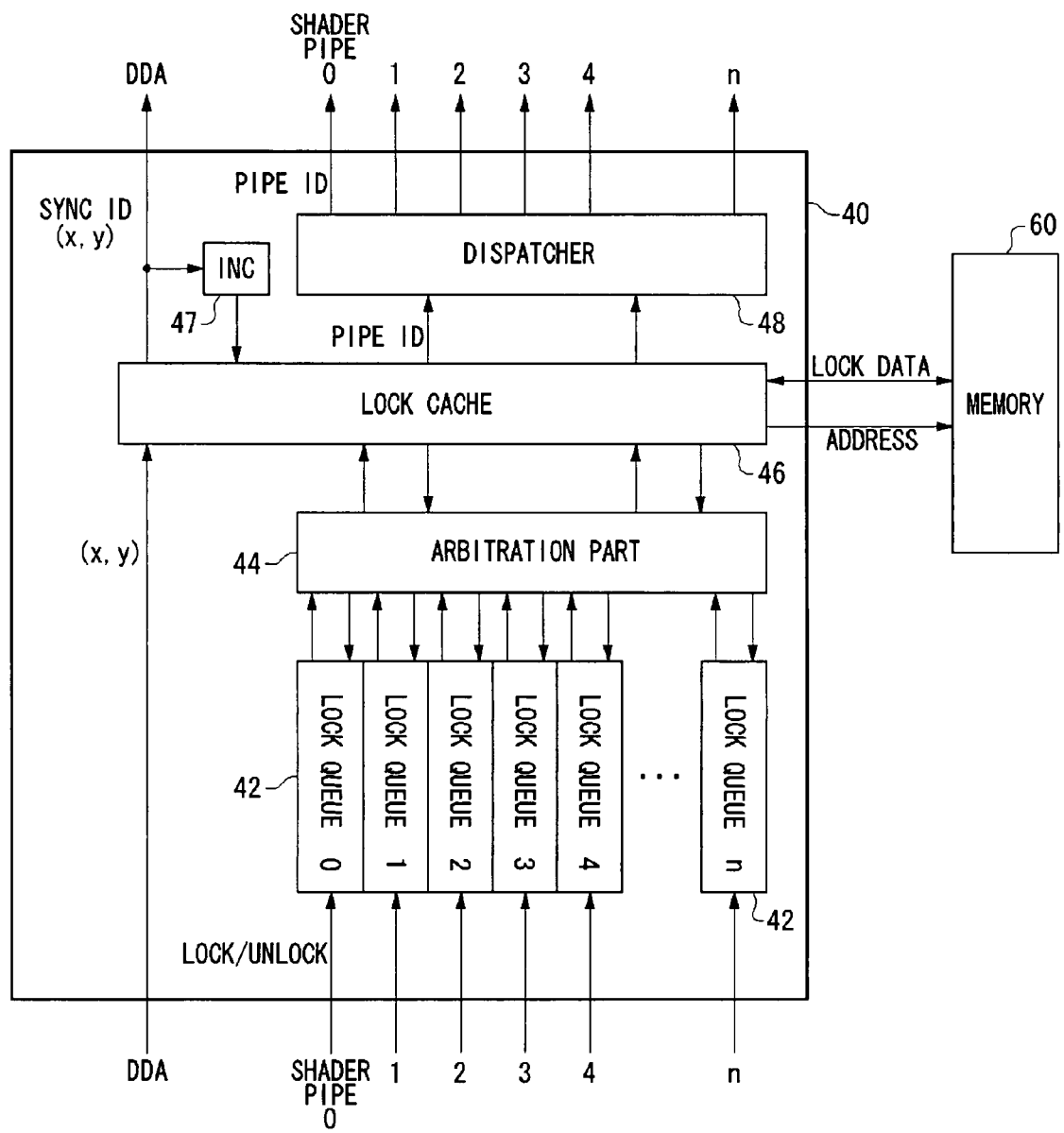
FIG. 2 is a block diagram of the exclusive control part of FIG. 1.

FIG. 2 is a block diagram of the exclusive control part 40. The exclusive control part 40 includes lock queues 42, an arbitration part 44, a lock cache 46, an increment part 47, and a dispatcher 48. Hereinafter, the detailed structure and operation of each of these functions will be described with also reference to FIGS. 3 to 5.

The lock queues 42 queue lock/unlock requests on pixels from the shader pipes 22 in a FIFO (First-In First-Out) scheme. Lock queues 0 to n are provided corresponding to the shader pipes 0 to n. Queued lock/unlock requests are taken from the head of the queues and supplied in succession to the arbitration part 44. Lock requests accepted by the arbitration part 44 are deleted from the queues. Lock requests rejected by the arbitration part 44 are input to the tail of the lock queues 42 again. On the other hand, unlock requests are always accepted by the arbitration part 44 and deleted from the queues.

The lock/unlock request herein includes a lock/unlock instruction, a pixel position (x, y), the ID of a requesting shader pipe 22 (hereinafter, referred to as "pipe ID"), and a sync ID. This pipe ID may be a physical identification number of the shader pipe 22, or an identification number that represents the logical unit of pipe processing. For example, if the shader pipes 22 have a mechanism for performing multi-thread operations, the pipe ID is a number for identifying each individual thread.

Figure 3:
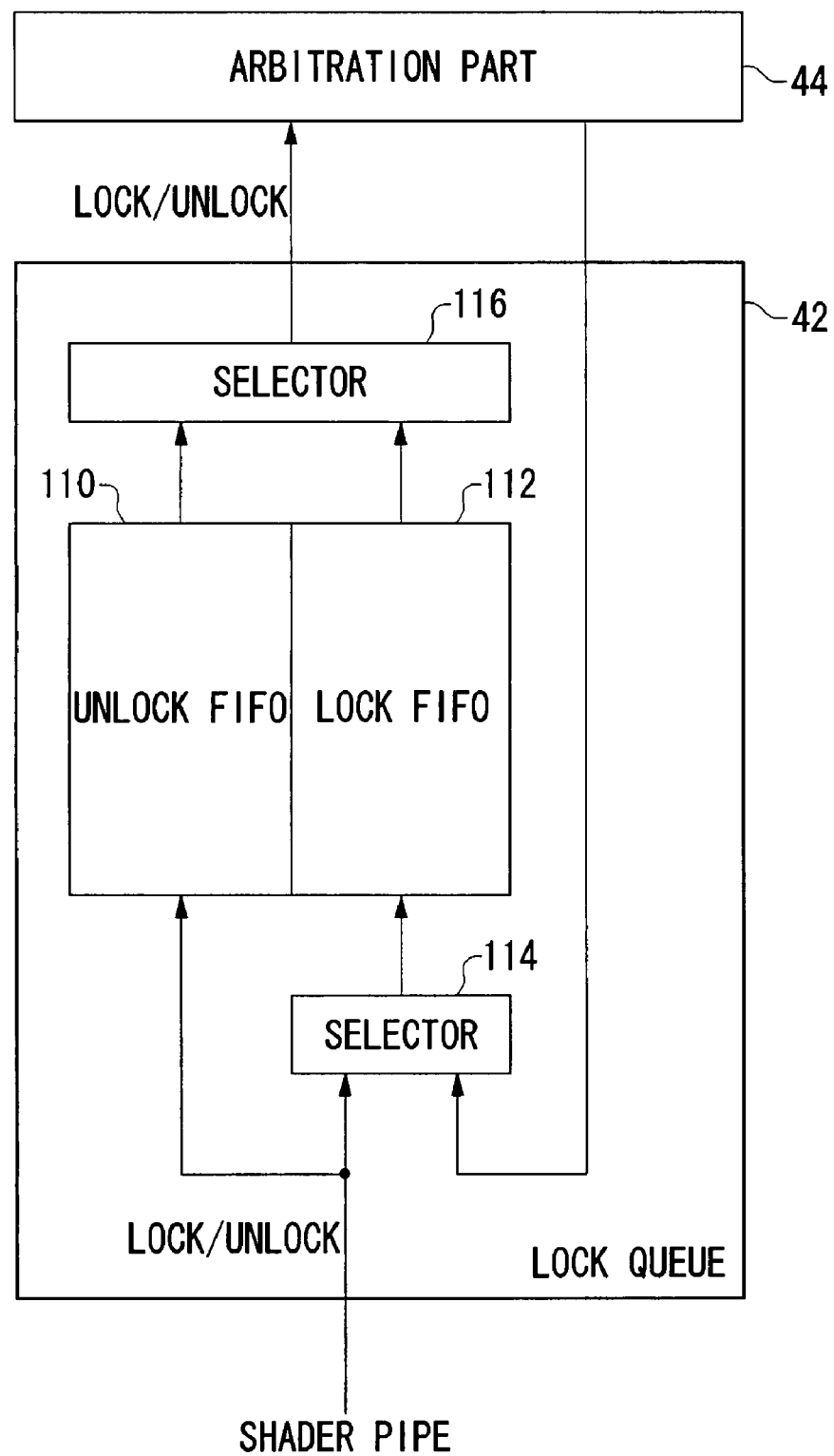
FIG. 3 is a detailed block diagram of a lock queue of FIG. 2.

FIG. 3 shows the detailed configuration of the lock queues 42. A lock queue 42 has an unlock FIFO 110 for queuing unlock requests, and a lock FIFO 112 for queuing lock requests. An unlock request from a shader pipe 22 is input to the unlock FIFO 110. A lock request from the shader pipe 22 is input to a selector 114. The selector 114 also receives the input of the lock request that has been rejected by the arbitration part 44, and switches between the new lock request input from the shader pipe 22 and the rejected lock request input from the arbitration part 44 and inputs either one to the tail of the queue of the lock FIFO 112.

A selector 116 arranged on the output side of the unlock FIFO 110 and the lock FIFO 112 receives input of an unlock request and a lock request taken from the head of the queues of the unlock FIFO 110 and the lock FIFO 112, and supplies the unlock request to the arbitration part 44 with priority over the lock request. Since the unlock FIFO 110 is given a higher priority, it is therefore possible to avoid dead lock. It should be appreciated that the unlock request will not be input to the unlock FIFO 110 again since the arbitration part 44 does not reject it.

The arbitration part 44 arbitrates the lock/unlock requests supplied from the respective lock queues 42 depending on the priorities of such, and supplies them to the lock cache 46. Since all the lock queues 42 do not necessarily queue lock/unlock requests all the time, the number of input ports from the arbitration part 44 to the lock cache 46 can be smaller than the number of lock queues 42.

Figure 4:
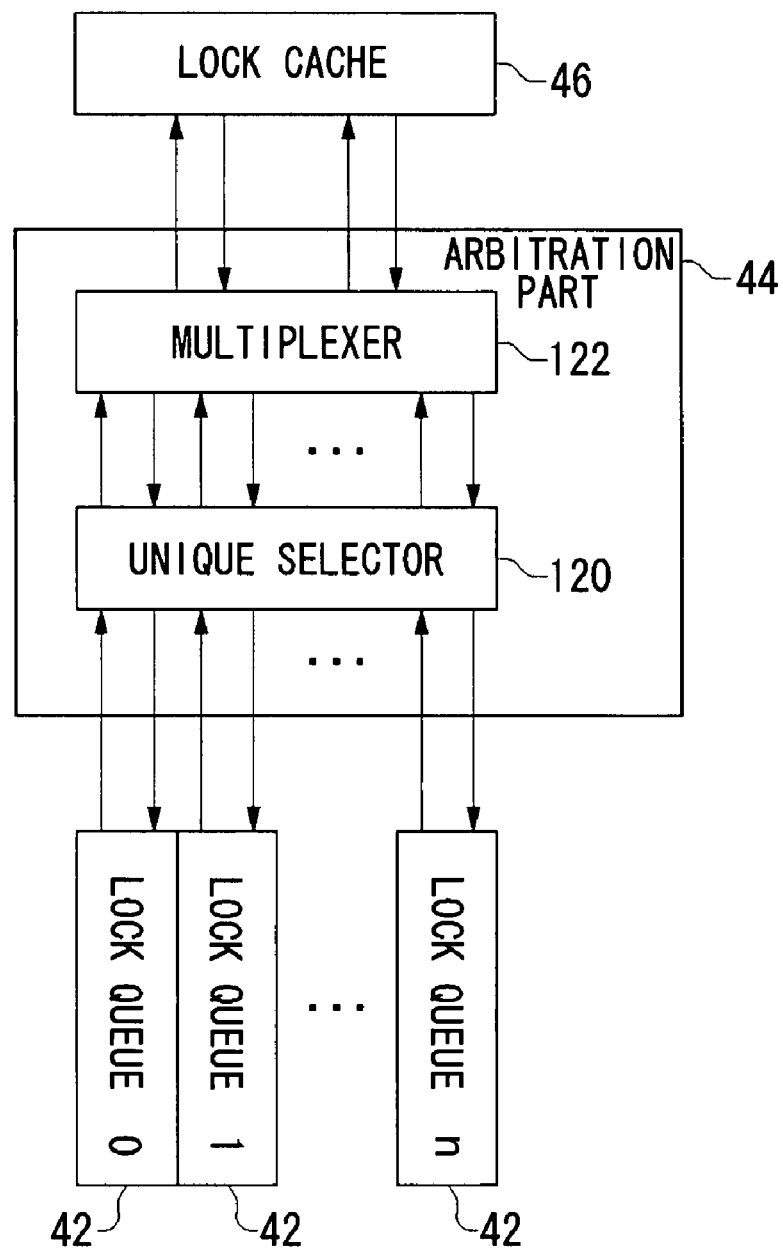
FIG. 4 is a detailed block diagram of the arbitration part of FIG. 2.

FIG. 4 shows the detailed configuration of the arbitration part 44. The arbitration part 44 has a unique selector 120 and a multiplexer 122. When receiving input of lock requests for an identical pixel position from a plurality of lock queues 42 simultaneously, the unique selector 120 selects only one lock request that has a high priority, supplies it to the multiplexer 122, and rejects and returns the other lock requests to the lock queues 42. Here, the priorities are assigned in units of the lock queues 42, and the lock requests are scheduled in a round robin fashion. When a lock request is taken from a lock queue 42 for execution, a control is exercised so that the lock queue 42 becomes relatively low in priority and the other lock queues 42 from which no lock request is taken become relatively high in priority.

The multiplexer 122 time-multiplexes the lock requests output from the unique selector 120, and supplies them to the lock cache 46. If the lock cache 46 is busy, the transmission of the lock request is delayed until it is ready for processing. Both the unique selector 120 and the multiplexer 122 preferably supply lock requests to the lock cache 46 in a priority-based round robin fashion. It should be noted that the unlock request may be passed through the unique selector 120 and the multiplexer 122, or may be supplied to the lock cache 46 directly, bypassing the unique selector 120 and the multiplexer 122.

The lock cache 46 caches lock information on the pixel in association with a logical address, where the logical address corresponds to the pixel coordinates (x, y).

Figure 5:
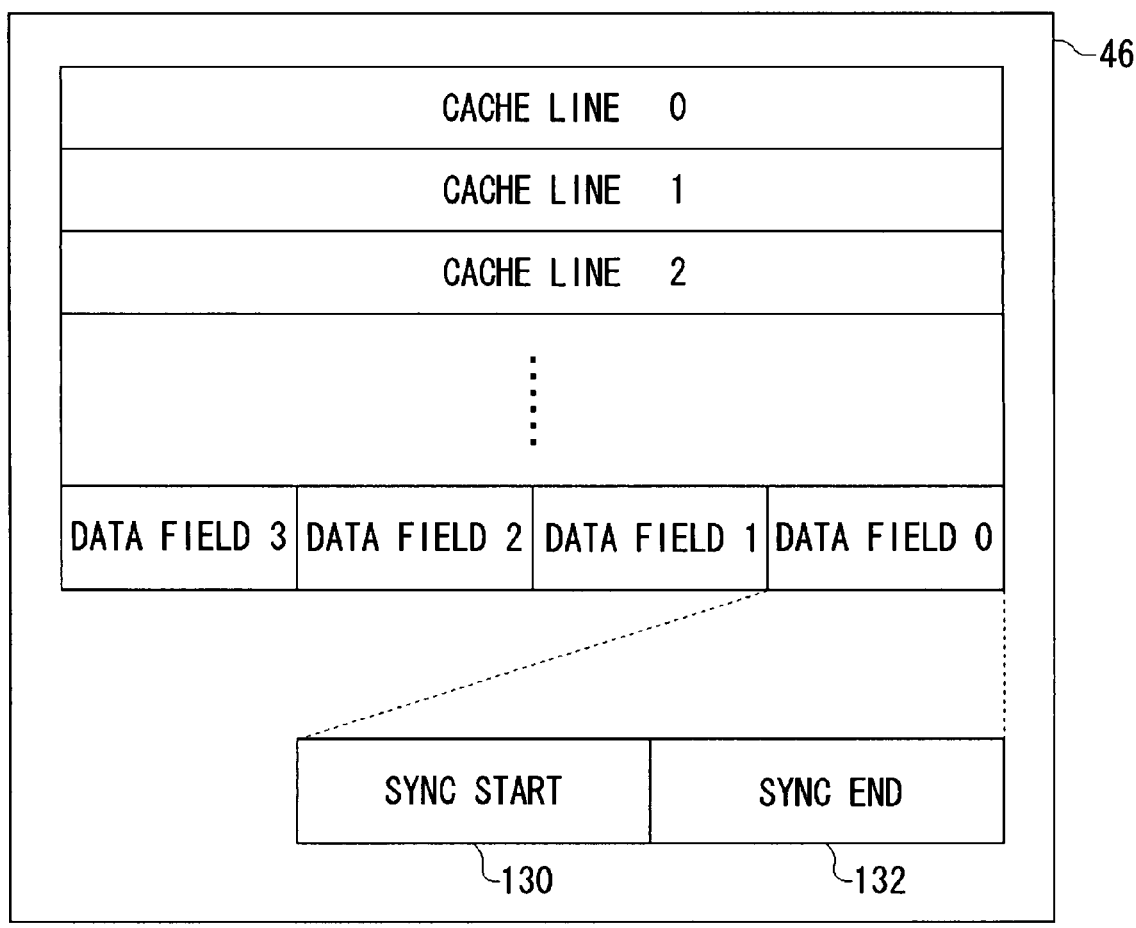
FIG. 5 is a diagram showing the structure of cache data stored in the lock cache of FIG. 2.

FIG. 5 shows the structure of cache data stored in the lock cache 46. Each cache line has data fields in which lock information consisting of two counters, or sync start 130 and sync end 132, is stored in association with an address corresponding to a pixel position.

The sync start 130 is a counter to be incremented each time the DDA 34 generates pixel data, and is used as a sync ID for indicating the order of execution of arithmetic processing on that pixel. The sync end 132 is a counter to be incremented each time arithmetic processing is actually performed on that pixel, and indicates the number of times arithmetic processing was executed. Both these two counters have an initial value of 0.

When the lock cache 46 receives input of pixel coordinate values (x, y) from the DDA 34, it checks whether or not lock information corresponding to that pixel position is cached. If a cache miss occurs, it caches the lock information stored in a memory 60 once, and acquires the cached value of the sync start 130. The lock cache 46 supplies the value of the sync start 130 corresponding to the pixel coordinates (x, y) to the DDA 34 as the sync ID, along with the pixel coordinates (x, y). The increment part 47 increments the value of the sync start 130 corresponding to the pixel coordinates (x, y) by one.

When a lock request is transmitted from the arbitration part 44, the lock cache 46 searches the cache with the pixel coordinates (x, y) included in the lock request as an address, and acquires the value of the sync end 132 corresponding to the pixel coordinates (x, y).

If the value of the sync ID included in the lock request is different from the cached value of the sync end 132, the lock cache 46 rejects the lock request, and simply sends the lock request from the arbitration part 44 back to the arbitration part 44. The arbitration part 44 sends back the lock request rejected by the lock cache 46 to a lock queue 42, and the lock queue 42 places the rejected lock request into the tail of the lock FIFO 112 again.

If the value of the sync ID included in a lock request coincides with the cached value of the sync end 132, the lock cache 46 supplies the pipe ID included in the lock request to the dispatcher 48.

Moreover, when the lock cache 46 receives an unlock request from the arbitration part 44, it increments the value of the sync end 132 corresponding to the pixel coordinates (x, y) included in the unlock request by one.

When the dispatcher 48 receives a pipe ID from the lock cache 46, it returns the pipe ID to the shader pipe 22 corresponding to the pipe ID.

Figure 6:
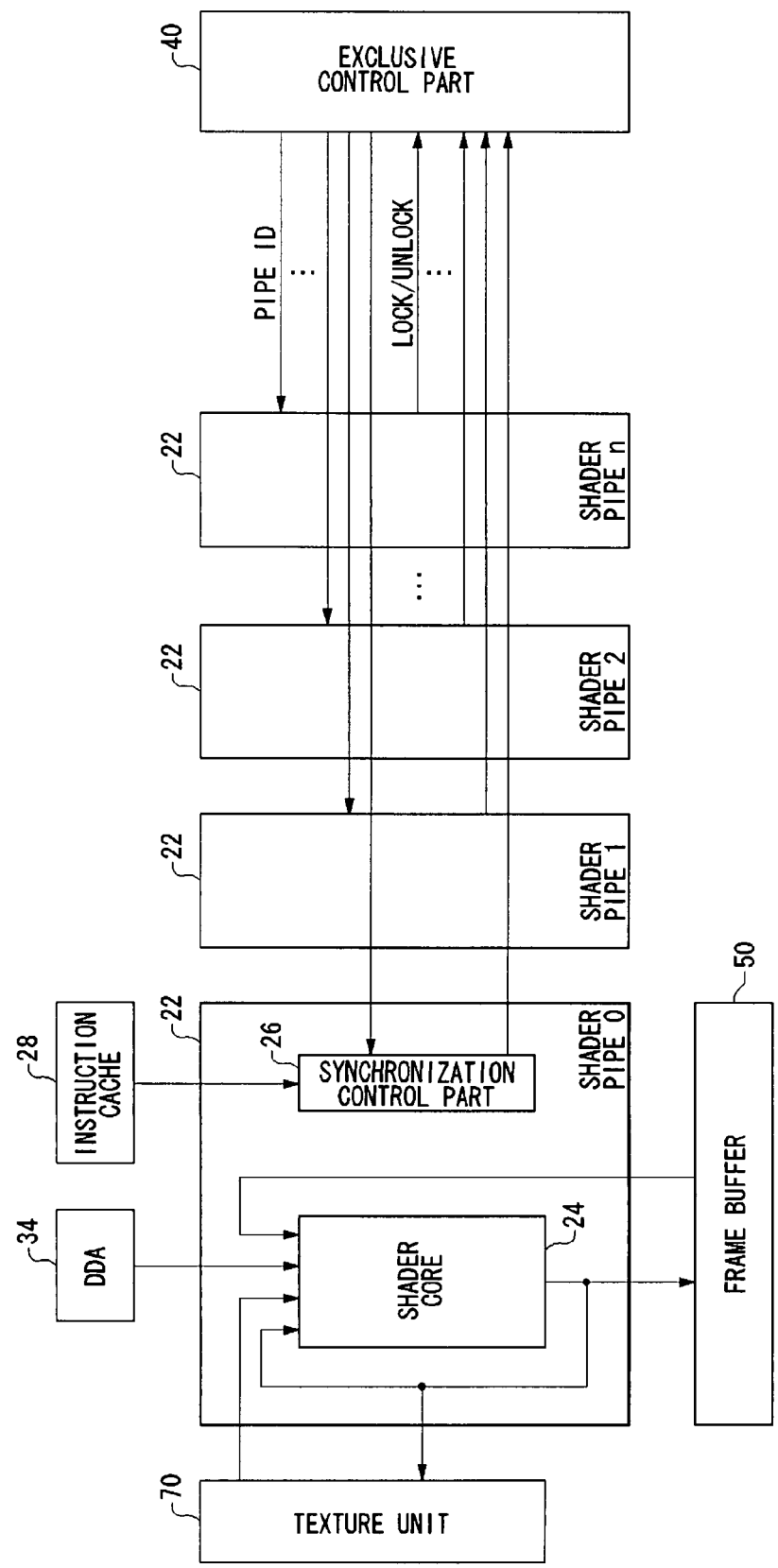
FIG. 6 is a detailed block diagram of the shader pipes of FIG. 1.

FIG. 6 is a detailed block diagram of the shader pipes 22. Each shader pipe 22 has a shader core 24, performs pipeline processing on pixel data supplied from the DDA 34 using a shader program, and outputs the result to the frame buffer 50. The shader core 24 provides the texture unit 70 with a specification on texture coordinates, receives texture data from the texture unit 70, and uses it for arithmetic processing on a pixel. The shader core 24 can also feed back the intermediate result of processing of the pixel for the next pixel operation. Moreover, the shader core 24 can perform a RMW (Read Modify Write) operation for reading pixel data retained in the frame buffer 50, applying arithmetic processing thereto, and writing the result to the frame buffer 50.

Pipeline processing to be executed by the shader core 24 sometimes takes from several cycles to ten or more cycles to complete. For the sake of higher efficiency, the shader core 24 is provided with a mechanism for processing a plurality of pixels in parallel using the multithread method or the interleaving method. The description is hereinafter given that the shader core 24 has a parallel processing mechanism using the multithread method.

A synchronization control part 26 of each shader pipe 22 acquires an instruction for a pixel from an instruction cache 28, and activates the shader core 24. If the instruction for the pixel is a lock instruction, it suspends arithmetic processing on that pixel and issues a lock request to the exclusive control part 40. The synchronization control part 26 switches to another thread for execution until the lock request is accepted.

If the lock request is accepted by the exclusive control part 40, the synchronization control part 26 of the shader pipe 22 receives the notification of the pipe ID from the exclusive control part 40. The synchronization control part 26 puts the thread corresponding to the pipe ID into operation so that the thread executes arithmetic processing subsequent to the lock instruction. If the exclusive control is no longer needed and an unlock instruction is issued or the shader program ends, the synchronization control part 26 sends an unlock request to the exclusive control part 40 to unlock the pixel.

As detailed above, when each shader pipe 22 executes a pixel operation that requires exclusive control, it issues a lock request to the exclusive control part 40 and puts the pixel operation into a wait state until the lock request is accepted. The exclusive control part 40 accepts only a single lock request for an identical pixel at any time. Thus, while one shader pipe 22 executes a pixel operation that includes a read or write of a pixel from/to the frame buffer 50, the other shader pipes 22 will not read or write the same pixel from/to the frame buffer 50. This achieves exclusive synchronization control on read and write of the identical pixel by a plurality of arithmetic processing parts.

Figure 7:
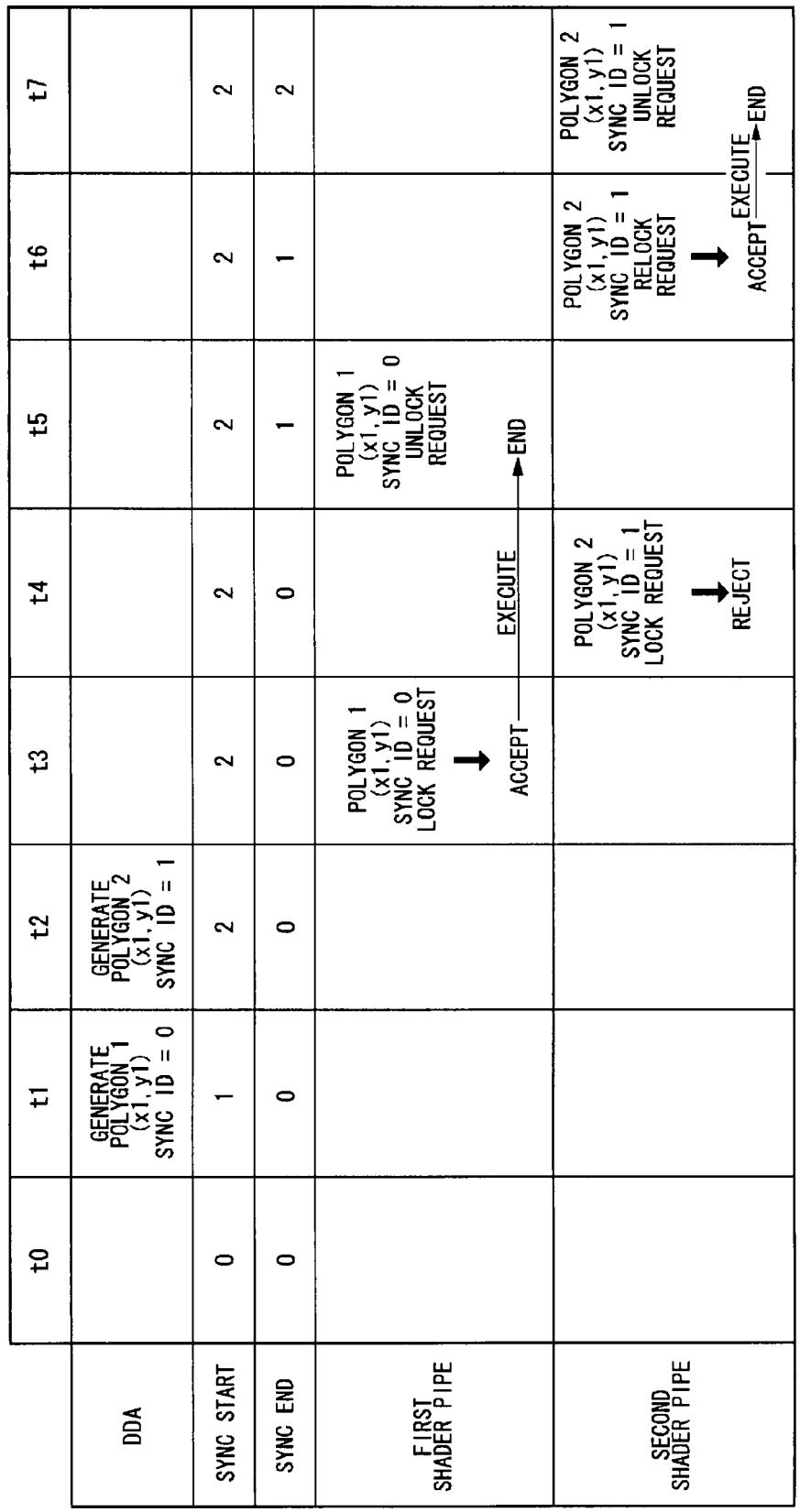
FIG. 7 is a diagram for illustrating and explaining a procedure by which the rendering processing apparatus of FIG. 1 exercises exclusive control on arithmetic processing on an identical pixel.

FIG. 7 is a diagram for illustrating and explaining a procedure by which the rendering processing apparatus 100 having the aforementioned configuration exercises exclusive control over arithmetic processing on an identical pixel. Here, a description will be given of the exclusive control exercised over arithmetic processing on a pixel position (x1, y1).

At time t0, both the sync start 130 and the sync end 132, or lock information associated with the pixel coordinates (x1, y1), are 0.

Consider that at time t1, the DDA 34 generates pixel data on a polygon 1 at the pixel coordinates (x1, y1). The DDA 34 supplies the pixel coordinate values (x1, y1) to the exclusive control part 40. The exclusive coordinate part 40 notifies the DDA 34 of "0," which is the value of the sync start 130 at time t0, as a sync ID in association with the pixel coordinate values (x1, y1), and increments the value of the sync start 130 from "0" to "1."

Consider that at time t2, the DDA 34 generates pixel data on a polygon 2 at the pixel coordinates (x1, y1). Since the pixel data on the polygon 1 is already generated at the pixel coordinates (x1, y1), it follows that the pixel data on the polygon 2 is generated at the same coordinates. The DDA 34 supplies the pixel coordinate values (x1, y1) to the exclusive control part 40.

The exclusive control part 40 reads the sync start 130 corresponding to the pixel coordinate values (x1, y1) from the cache. The value of the sync start 130 at time t1 is "1." The exclusive control part 40 notifies the DDA 34 of the value "1" of the sync start 130 at time t1, or the sync ID, in association with the pixel coordinate values (x1, y1), and increments the value of the sync start 130 from "1" to "2."

At time t3, when a first shader pipe 22 performs arithmetic processing on the pixel (x1, y1) of the polygon 1, it issues to the exclusive control part 40 a lock request having the pixel coordinate values (x1, y1) and the value "0" of the sync ID.

The exclusive control part 40 accepts the lock request since the current value of the sync end 132 is 0 and the value of the sync ID notified as the lock request from the first shader pipe 22 is also 0, or since the two values coincide with each other. Once the lock request is accepted, the first shader pipe 22 performs the arithmetic processing on that pixel (x1, y1).

At time t4, when a second shader pipe 22 performs arithmetic processing on the same pixel (x1, y1) of the polygon 2, it issues to the exclusive control part 40 a lock request having the pixel coordinate values (x1, y1) and the sync ID "1".

The exclusive control part 40 rejects the lock request since the current value of the sync end 132 is 0 and the value of the sync ID notified as the lock request from the second shader pipe 22 is 1, or since the two values do not coincide with each other. The second shader pipe 22 waits without performing the arithmetic processing on that pixel. The rejected lock request is queued again.

At time t5, the first shader pipe 22 completes the arithmetic processing on the pixel (x1, y1). The first shader pipe 22 supplies to the exclusive control part 40 an unlock request having the pixel coordinate values (x1, y1). The exclusive control part 40 receives the unlock request, and increments the value of the sync end 132 corresponding to the pixel coordinate values (x1, y1) from "0" to "1." This releases the locking of the pixel (x1, y1) by the first shader pipe 22.

Consider that at time t6, the rejected lock request from the second shader pipe 22 is taken out. The exclusive control part 40 accepts the lock request since the value of the sync ID of the lock request is 1 and the current value of the sync end 132 corresponding to the pixel (x1, y1) is also 1, or since the two values coincide with each other. Once the lock request is accepted, the second shader pipe 22 performs the arithmetic processing on that pixel (x1, y1).

At time t7, the second shader pipe 22 completes the arithmetic processing on the pixel (x1, y1). The second shader pipe 22 supplies to the exclusive control part 40 an unlock request having the pixel coordinate values (x1, y1). The exclusive control part 40 receives the unlock request, and increments the sync end 132 corresponding to the pixel coordinate values (x1, y1) from "1" to "2." This releases the locking of the pixel (x1, y1) by the second shader pipe 22.

In the foregoing procedure example, the lock request for the pixel (x1, y1) by the first shader pipe 22 is followed by the lock request for the same pixel (x1, y1) by the second shader pipe 22. These lock requests may sometimes be made in reverse order. Even when the second shader pipe 22 makes the lock request for the pixel (x1, y1) first, the sync ID assigned to the pixel (x1, y1) of the polygon 2 is "1." The first shader pipe 22 therefore starts processing the pixel (x1, y1) of the polygon 1, and the lock request from the second shader pipe 22 will not be accepted until the processing ends. Consequently, the processing of the pixel (x1, y1) by the second shader pipe 22 enters a wait state via exactly the same procedure, and the order of execution of the arithmetic processing on the pixel (x1, y1) coincides with the order of generation of the polygons 1 and 2 by the DDA 34. The order of execution is thus ensured by the synchronization processing.

As has been described, according to the rendering processing apparatus 100 of the present embodiment, there is provided a synchronization mechanism which manages lock information on rasterized pixel data in a centralized fashion. Each of the pixel pipes locks a pixel before performing an RMW operation on the pixel, and releases the lock after the RMW operation. This makes it possible to exercise exclusive control on arithmetic processing on pixels. Consequently, pixel operations that require no exclusive control can be processed in an arbitrary order of execution in parallel. Furthermore, processing pixel operations that require exclusive control, such as ones including an RMW operation, can be processed in a proper order of execution exclusively. Even if there are a large number of pixels to render, it is possible to exercise exclusive control without lowering the performance of the rendering processing.

According to the rendering processing apparatus 100 of the present embodiment, complicated processing that requires exclusive control, such as pixel-by-pixel sort processing, can also be performed efficiently by parallel processing.

Since the synchronization mechanism of the present embodiment makes it possible to exercise exclusive control over pixel operation processing that includes RMW operations, an RMW unit is no longer required to be separated from the shader 20. The shader 20 can perform pixel operations while reading and writing from/to the frame buffer 50, with a significant increase in the flexibility of pixel operations.

In such a configuration where an RMW unit is separated from the shader 20 to provide independent exclusive control over the RMW, an identical pixel can be processed by a plurality of shader pipes 22, if the shader 20 further increases the degree of parallelism of pixel operations and performs pixel operations at a greater speed. For this reason, pixel operations that include no RMW operation also require exclusive control over arithmetic processing on an identical pixel. The synchronization mechanism of the present embodiment can be similarly applied to exclusive control over such pixel operation processing which includes no RMW operation.

The present invention has been described in conjunction with the embodiment thereof. The foregoing embodiment has been given solely by way of illustration. It will be understood by those skilled in the art that various modifications may be made to combinations of the foregoing components and processes, and all such modifications are also intended to fall within the scope of the present invention. Such modifications will now be described below.

The foregoing description has dealt with a synchronization mechanism which is intended to ensure the order of execution of rendering operations on rasterized pixel data. However, the present invention is not limited to rendering operations on rasterized pixel data, but may also be applied to geometric operations. The synchronization mechanism of the present invention is effective for situations where calculations on the same positions are repeated and exclusive control is required, such as when calculating polygon meshes.

The present invention is also applicable to fields other than pixel operations. The synchronization mechanism of the present invention can be effectively applied when a processing request for an identical address is made from a plurality of processors or a plurality of threads, and when exclusive control is required to ensure the order of processing. In particular, when performing calculations having a high degree of parallelism, exclusive control can be exercised effectively if lock information having a counter indicating order of execution and a counter indicating the number of the execution is cached in advance with respect to each processing unit.

INDUSTRIAL APPLICABILITY

The present invention is applicable to the fields of parallel processing and rendering processing.

What is claimed is:
1. A rendering processing apparatus comprising:
a rasterizer, which rasterizes a rendering primitive in succession to generate a plurality of pixels;
a shader having a plurality of arithmetic processing parts, which perform arithmetic processing on the plurality of pixels in parallel; and
an exclusive control part, which locks a pixel subject to arithmetic processing so that an arithmetic processing part is configured to exercise exclusive control over arithmetic processing of the subject pixel, wherein the exclusive control part is operable:
- to maintain a lock cache that caches a sync start value and a sync end value for each positional address of a pixel subject to arithmetic processing;
- to assign a sync value to each of the plurality of pixels received by the rasterizer regardless of whether each of the plurality of pixels needs to be subject to exclusive control, the sync value of each of the received pixels being the sync start value indicated for the respective positional address contained in the lock cache;
- to update, when a same-position pixel is received by the rasterizer with an identical positional address to a pixel that has already been assigned a sync id, the sync start value for the positional address of the same-position pixel in the lock cache, and to give the same-position pixel a sync id of the newly-updated sync start value; and
- to make a determination to accept a lock request issued by the arithmetic processing part for a pixel subject to arithmetic processing.

2. The rendering processing apparatus as recited in claim 1, wherein the exclusive control part has a cache memory, which stores the lock cache and the sync value for each of the plurality of pixels, the sync start value of a positional address being updated each time a respective pixel is acually processed by the arithmetic processingh part.

3. The rendering processing apparatus as recited in claim 2, wherein a lock request is accepted by the exclusive control part to lock the subject pixel if the sync id of the subject pixel is equal to the sync end value indicated in the lock cache at the respective positional address of the subject pixel, whereby, when the arithmetic processing of the subject pixel is completed, the lock request is terminated and the respective sync end value is incremented.

4. A parallel processing apparatus comprising:
- a plurality of arithmetic processing parts, which perform arithmetic processing on a plurality of processing units in parallel;
- an assignment part, which assigns to each processing unit in advance a sync value regardless of whether each of the plurality of processing units needs to be subject to exclusive control; and
- an exclusive control part, which maintains a lock cache that caches a sync start value and a sync end value for each of a plurality of positional addresses represented by the plurality of processing units,
- wherein the sync value of each processing unit is the sync start value indicated for each positional address, respectively, contained in the lock cache,
- wherein the exclusive control part receives a request to lock a target processing unit subject to arithmetic processing by an arithmetic processing part among the plurality of arithmetic processing parts, and
- wherein the exclusive control part accepts the lock request in order of the sync value assigned to the target processing unit, whereby the order of execution of the arithmetic processing on an identical processing unit performed by the plurality of arithmetic processing parts is controlled.

5. The parallel processing apparatus recited in claim 4, further comprising a cache memory, which stores the lock cache and the sync value with respect to each processing unit.

6. The parallel processing apparatus recited in claim 5, wherein the exclusive control part updates, for the target processing unit, the sync start value in the lock cache if the target processing unit subject to arithmetic processing shares a positional address with a second processing unit and replaces the sync id of the target processing unit with the updated sync start value.

7. The parallel processing apparatus recited in claim 6, wherein the exclusive control part is operable to accept a lock request to lock the target processing unit if the sync id of the target processing unit is equal to the sync end value indicated in the lock cache at a respective positional address of the target processing unit, whereby, when the arithmetic processing of the target processing unit is completed, the lock request is terminated and the respective sync end value is be incremented.

8. An exclusive control method for providing exclusive control in an apparatus that performs arithmetic processing on a plurality of processing units in parallel, the method comprising:
- assigning to each processing unit in advance a sync value regardless of whether each of the plurality of processing units needs to be subject to exclusive control;
- maintaining a lock cache in a cache memory that caches a sync start value and a sync end value for each of a plurality of positions of the plurality of processing units;
- receiving requests to lock a target processing unit subject to arithmetic processing when the arithmetic processing on the plurality of processing units is actually performed;
- updating the sync start value in the lock cache for a position of the target processing unit when a second processing unit shares the position, and assigning the position a sync ID of the newly-updated sync start value; and
- accepting the lock requests in order of the sync value assigned to the target processing unit, whereby the order of execution of the arithmetic processing on an identical processing unit is controlled.

9. The exclusive control method recited in claim 8, wherein:
- a lock request is accepted to lock the target processing unit if the sync id of the target processing unit is equal to the sync end value indicated in the lock cache at the position of the target processing unit, whereby, when the arithmetic processing of the target processing unit is completed, the lock request is terminated and the indicated sync end value is incremented, and
- a lock request is rejected to lock the target processing unit if the sync id of the target processing unit is not equal to the sync end value indicated in the lock cache at the position of the target processing unit, whereby arithmetic processing is temporarily suspended.

10. The rendering processing apparatus as recited in claim 2, wherein a lock request is rejected by the exclusive control part to lock the subject pixel if the sync id of the subject pixel is not equal to the sync end value indicated in the lock cache at the respective positional address of the subject pixel, whereby arithmetic processing is temporarily suspended.

* * * * *

UNITED STATES PATENT AND TRADEMARK OFFICE
CERTIFICATE OF CORRECTION

| | |
|---|---|
| PATENT NO. | : 8,363,059 B2 |
| APPLICATION NO. | : 11/793640 |
| DATED | : January 29, 2013 |
| INVENTOR(S) | : Junichi Naoi |

It is certified that error appears in the above-identified patent and that said Letters Patent is hereby corrected as shown below:

In the Claims

Column 11, line 28, "processingh" should read -- processing --

Signed and Sealed this
Twenty-fifth Day of November, 2014

Michelle K. Lee
*Deputy Director of the United States Patent and Trademark Office*